J. PIKE.
Churn.
No. 30,930.                                    Patented Dec. 18, 1860.
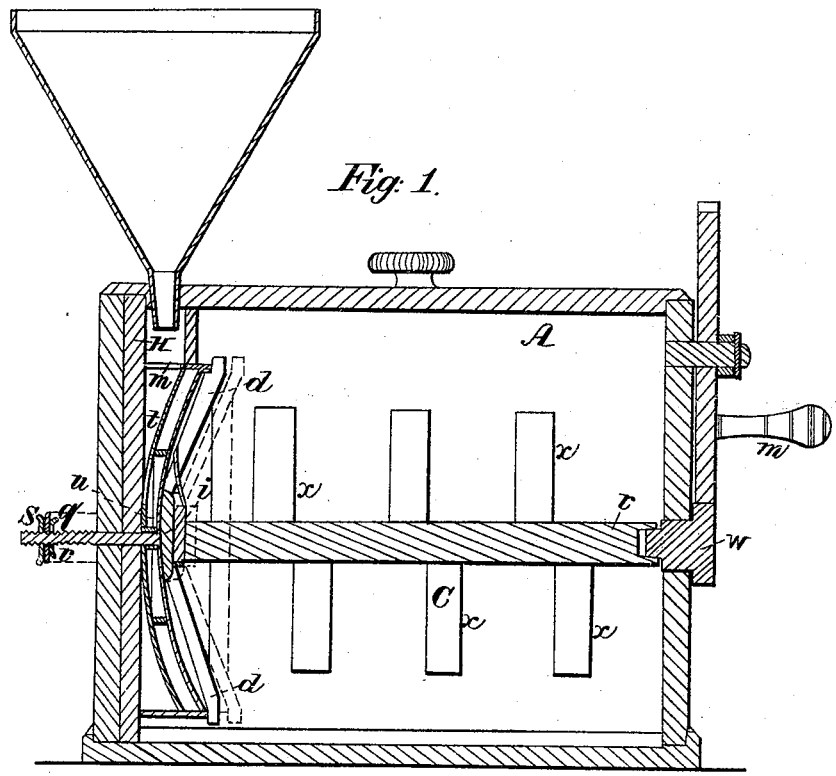
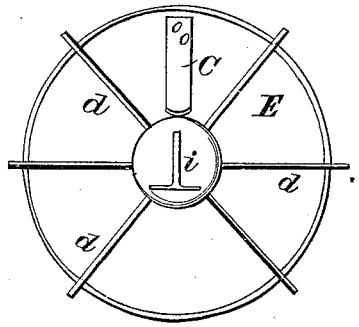
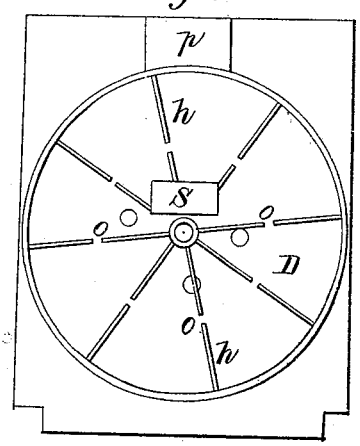
Witnesses.                                     Inventor.

UNITED STATES PATENT OFFICE.

JOHN PIKE, OF SYRACUSE, NEW YORK.

CHURN.

Specification of Letters Patent No. 30,930, dated December 18, 1860.

*To all whom it may concern:*

Be it known that I, JOHN PIKE, of Syracuse, in the county of Onondaga and State of New York, have invented a new and Improved Churn; and I do hereby declare that the following is a full, clear, and exact description and specification of the construction and operation of the same, reference being had to the annexed drawings, making a part of this specification, in which—

Figure 1, is a longitudinal section; Fig. 2, is a detailed view of the concavo convex dish E, and Fig. 3, is a like view of the convex dish D.

In the following description like letters and figures refer to like parts.

A, represents the churn box; B, the receiving pan; C, the revolving shaft; D, the convex dish; E, the concavo-convex dish; c, the spring; d, the wings upon the concavo or outer side of the concavo-convex dish; e, the opening in dish D, for the pivot rod u; u, the pivot rod threaded at its outer end attached to the concavo-convex dish E, and extending through the end of the churn, as shown in Fig. 1; v socket in shaft C; w the cog shaft; s, and v, thumb screws; q, pivot plate; f, slot in concave dish D; h h radial ribs on dish D; t, Fig. 1, projecting ring revolving through the radial ribs o, o, o; i, a sawcalf; x, x, dashers.

To enable others skilled in the art to make and use my invention I will proceed to describe its construction and operation.

The body of the churn A, is made of wood of any desired proportions. The receiving pan B, is made of metal and of a capacity sufficient to introduce the proper quantity of milk according to the size of the churn. The shaft C, is made of wood and has dashers such as have been before used. The shaft C, also has at one of its ends a socket into which sets the cogshaft w; which socket is large enough to admit the play of the shaft C, backward and forward, by which to adjust the shaft C, at a shorter or longer length and is in a square form corresponding to the cogshaft w. This shaft C, at the opposite end has a slot which enters the sawcalf i.

For a churn suitable to a small dairy I have a stationary concave dish or plate D (but which may be adjusted by means of its attachment the slide H), say eight inches in diameter, upon the opposite inside end from my gearing with the radial beaters h, h, &c., and the surrounding flange m, Fig. 1. In the exact center of this concave dish is the opening e for the pivot rod u. At about one half the length of these radial beaters each one is disconnected to admit the play of the concentric flange of the concavo-convex dish E. In this dish is the slot f, to admit the milk into the dishes. Setting into the concave dish D, is the concavo-convex dish E, furnished with beaters similar to those on dish D, and also with the concentric ring t, Fig. 1, projecting from the convex surface of the dish E. On the concave surface of this dish is the spring c, used to retain the shaft C, on the sawcalf i. Also on the concave surface of the dish E, is attached the radial wings d, d, &c., which project over the flange n, Fig. 1, and sweep nearly the bottom of the churn. The pivot arm u, is threaded at its outer end and rests upon the crank plate q; on the thread are the thumb screws s and v. By this arrangement the concavo-convex dish E can be adjusted to a greater or less distance from the concave dish D; fixing the two dishes farther apart when churning cream, shown by the red lines in Fig. 1, and close together when churning milk, as shown in Fig. 1.

The operation of my churn is as follows: The milk and cream is poured into the pan B, when the dasher is in quick motion and the motion ought to be kept up until the butter comes, which is ordinarily inside of two minutes with sweet milk and one minute with cream. The milk or cream passes down the conduit p, through the slot f, into the two dishes D and E, being received first in the chamber formed by the concentric projecting ring or flange t, and is there agitated and partially ground. The convexity of the dish E, convergence of the beaters, and the barrier formed by the flange t, keeps the milk or cream under the action of the beaters longer than any other arrangement which your petitioner is aware of. After passing from this chamber, the milk or cream is subjected to the operation of the beaters outside of the flange t, from whence it passes at the outer edges of the dishes into the body A, of the churn. Meantime a continual current of air is created by the revolution of the wings d, d, which air passing from the bottom of the churn to the top regularly, is distributed through all the milk greatly facilitating the process of butter making and materially improving the quality. The butter when formed is taken from the churn by removing the shaft C.

What I claim as new and desire to secure by Letters Patent, is—

The combination and arrangement of the adjustable convex dish D, concavo convex dish E, with the radial beaters on each as described, together with the wings $d, d$, shaft C, and dashers $x, x$, &c., when used for the purposes specified.

JOHN PIKE.

Witnesses:
   Jer. McLutin,
   Randolph Coyle, Jr.